US008487967B2

(12) United States Patent
Yoshiga

(10) Patent No.: US 8,487,967 B2
(45) Date of Patent: Jul. 16, 2013

(54) ACTIVE MATRIX DISPLAY DEVICES AND ELECTRONIC DEVICES HAVING THE SAME

(75) Inventor: Masahiro Yoshiga, Hyogo (JP)

(73) Assignee: Chimei Innolux Corporation, Miaoli County (TW)

( * ) Notice: Subject to any disclaimer, the term of this patent is extended or adjusted under 35 U.S.C. 154(b) by 273 days.

(21) Appl. No.: 12/857,141

(22) Filed: Aug. 16, 2010

(65) Prior Publication Data

US 2011/0037787 A1 Feb. 17, 2011

(30) Foreign Application Priority Data

Aug. 17, 2009 (JP) ................................ 2009-188553

(51) Int. Cl.
*G09G 5/10* (2006.01)
*G06F 3/041* (2006.01)

(52) U.S. Cl.
USPC .......................................... 345/690; 345/175

(58) Field of Classification Search
USPC .............................. 345/87, 173, 174; 349/39
See application file for complete search history.

(56) References Cited

U.S. PATENT DOCUMENTS

2009/0147164 A1* 6/2009 Toyoshima et al. ............. 349/39
2009/0179839 A1* 7/2009 Yamashita et al. .............. 345/87

FOREIGN PATENT DOCUMENTS

| | | |
|---|---|---|
| JP | 06-195048 | 7/1994 |
| JP | 09-258169 | 10/1997 |
| JP | 2000-081606 | 3/2000 |
| JP | 2001-265287 | 9/2001 |
| JP | 2004-518339 | 6/2004 |
| JP | 2005-031164 | 2/2005 |
| JP | 2007-240751 | 9/2007 |
| JP | 2009-042443 | 2/2009 |

OTHER PUBLICATIONS

English language translation of abstract of JP 06-195048 (published Jul. 15, 1994).
English language translation of abstract of JP 2000-081606 (published Mar. 21, 2000).
English language translation of abstract of JP 2005-031164 (published Feb. 3, 2005).
English language translation of abstract of JP 2007-240751 (published Sep. 20, 2007).
English language translation of abstract of JP 2009-042443 (published Feb. 26, 2009).
English language translation of abstract of JP 2004-518339 (published Jun. 24, 2004).
Japanese language office action dated Sep. 6, 2011.
English language translation of abstract JP 09-258169 (published Oct. 3, 1997).
English language translation of abstract of JP 2001-265287 (published Sep. 28, 2001).

* cited by examiner

*Primary Examiner* — Michael Faragalla
(74) *Attorney, Agent, or Firm* — McClure, Qualey & Rodack, LLP

(57) ABSTRACT

An active matrix display device is provided and includes a plurality of pixels arranged in a matrix and a backlight source disposed at the backside of the matrix which emits light to the matrix. Each pixel includes a liquid crystal (LC) element, a driving controlling switch, and a storage capacitor. The driving controlling switch controls the driving of the LC element. The storage capacitor stores image data provided to the LC element through the driving controlling switch. The display device further includes a luminance detector and a voltage supplier. The luminance detector detects luminance of the backlight source. According to the detected luminance, the voltage supplier, in a sustain period of the image data, provides a predetermined voltage to a node of the storage capacitor which is opposite to a node of the storage capacitor coupled to the LC element.

18 Claims, 8 Drawing Sheets

ACTIVE MATRIX DISPLAY DEVICES AND ELECTRONIC DEVICES HAVING THE SAME

CROSS REFERENCE TO RELATED APPLICATIONS

This application claims the benefit of Japan application Serial No. 2009-188553 filed Aug. 17, 2009, the subject matter of which is incorporated herein by reference.

BACKGROUND OF THE INVENTION

1. Field of the Invention

The invention relates to an active matrix display device which comprises a plurality of pixels arranged in a matrix and a backlight source disposed at the backside of the matrix which emits light to the matrix, and more particularly to an electronic device having the display device.

2. Description of the Related Art

In a conventional active matrix display device using liquid crystal (LC) elements, each pixel comprises a driving controlling switch which controls image data to be written into the corresponding liquid crystal element and a storage capacitor which stores the image data during new image data is written into the liquid crystal element. However, the image data which stored in the storage capacitor by charges may be lost due to leakage current. The leakage current causes pixel voltage to lower, thereby resulting in flicker.

For example, Japan Publication No. 2004-518993 (Reference 1) discloses an invention for reducing leakage current from storage capacitors.

In prior art, leakage current of a pixel is compensated for by using increasing capacitance of a storage capacitor in the pixel or inserting an amplifier circuit between the storage capacitor and a liquid crystal element. However, the aperture ratio is reduced. When the aperture ratio is reduced, for a transparent liquid crystal display device with a backlight source, the luminance of the backlight source has to be enhanced, resulting in increased power consumption.

BRIEF SUMMARY OF THE INVENTION

Thus, the invention provides an active matrix display device and an electronic device with a display device which can compensate for leakage current without reduction of the aperture ratio.

An exemplary embodiment of an active matrix display device which comprises a plurality of pixels arranged in a matrix and a backlight source disposed at the backside of the matrix and emitting light to the matrix. Each of the pixels comprises a liquid crystal (LC) element, a driving controlling switch, and a storage capacitor. The driving controlling switch controls the driving of the liquid crystal element. The storage capacitor stores image data provided to the liquid crystal element through the driving controlling switch. The display device further comprises a luminance detector and a first voltage supplier. The luminance detector detects luminance of the backlight source. According to the detected luminance of the backlight source, the first voltage supplier, in a sustain period of the image data, provides a predetermined voltage to a node of the storage capacitor which is opposite to a node of the storage capacitor coupled to the liquid crystal element.

Accordingly, the voltage based on the luminance of the backlight source can be provided to the storage capacitor without the change of the pixel structure. Thus, the invention can provide an active matrix display device and an electronic device with the display device which can compensate for leakage current without reduction of the aperture ratio.

In one embodiment, the luminance detector detects the luminance of the backlight source by detecting the light from the backlight source or by measuring the amount of driving current used to drive the backlight source. In another embodiment, the luminance detector detects the luminance of the backlight source according to contents shown by the display device.

In another embodiment, the first voltage supplier comprises a variable voltage supply source, a voltage calculator, and a voltage source controller. The voltage calculator calculates the first predetermined voltage according to the detected luminance of the backlight source by the luminance detector. The voltage source controller controls the variable voltage supply source to provide the first predetermined voltage which is calculated by the voltage calculator. The voltage calculator calculates the first predetermined voltage according to a relationship between the luminance of the backlight source and leakage current of the driving controlling switch. Alternatively, the voltage calculator stores a look-up table which has the first predetermined voltage corresponding to the luminance of the backlight source.

In a preferred embodiment, the active matrix display device further comprises a temperature detector for detecting temperature. The voltage calculator calculates the first predetermined voltage according to the luminance of the backlight source detected by the luminance detector and the temperature detected by the temperature detector.

In one embodiment, the first voltage supplier provides the first predetermined voltage to the storage capacitor through a CS line.

In another embodiment, for one pixel on a row of the matrix, the first voltage supplier provides the first predetermined voltage to the storage capacitor of the one pixel through a gate line on an adjacent row to the row of the one pixel.

Moreover, in another preferred embodiment, the active matrix display device further comprises a second voltage supplier. According to the detected luminance of the backlight source, the second voltage supplier, in a sustain period of the image data, provides a second predetermined voltage to a node of the liquid crystal element which is opposite to a node of the liquid crystal element coupled to the storage capacitor.

The active matrix display device of the embodiments can be applied in an electronic device with a display device for showing images, such as a television, a mobile phone, a witch, a personal digital assistant (PDA), a tablet computer, an automotive navigation system, a portable machine, and an aurora vision.

According to the embodiments, the invention can provide an active matrix display device and an electronic device with the display device which can compensate for leakage current without reduction of the aperture ratio.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
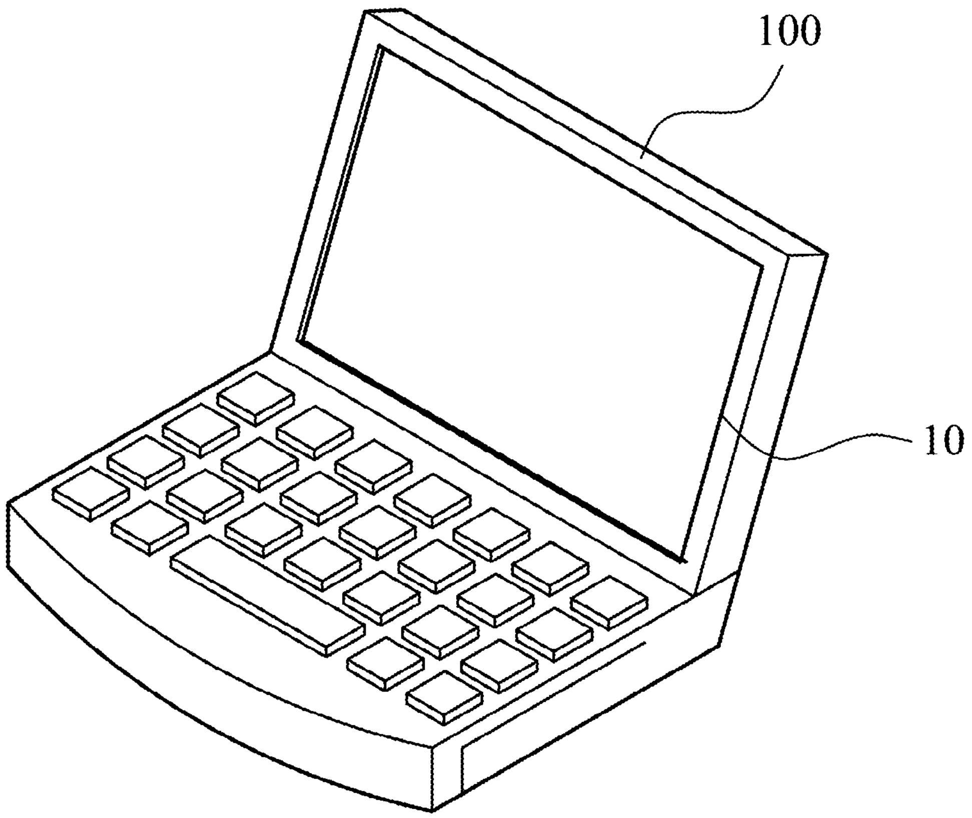
FIG. 1 shows an exemplary embodiment of an electronic device with a display device.

FIG. 1 shows an exemplary embodiment of an electronic device with a display device. An electronic device 100 in FIG. 1 is shown as a portable computer. However, the electronic device 100 can be other devices, such as a television, a mobile phone, a witch, a personal digital assistant (PDA), a tablet computer, an automotive navigation system, a portable machine, and an aurora vision. The electronic device 100 comprises a display device 10 which comprises a display panel for displaying images.

Figure 2:
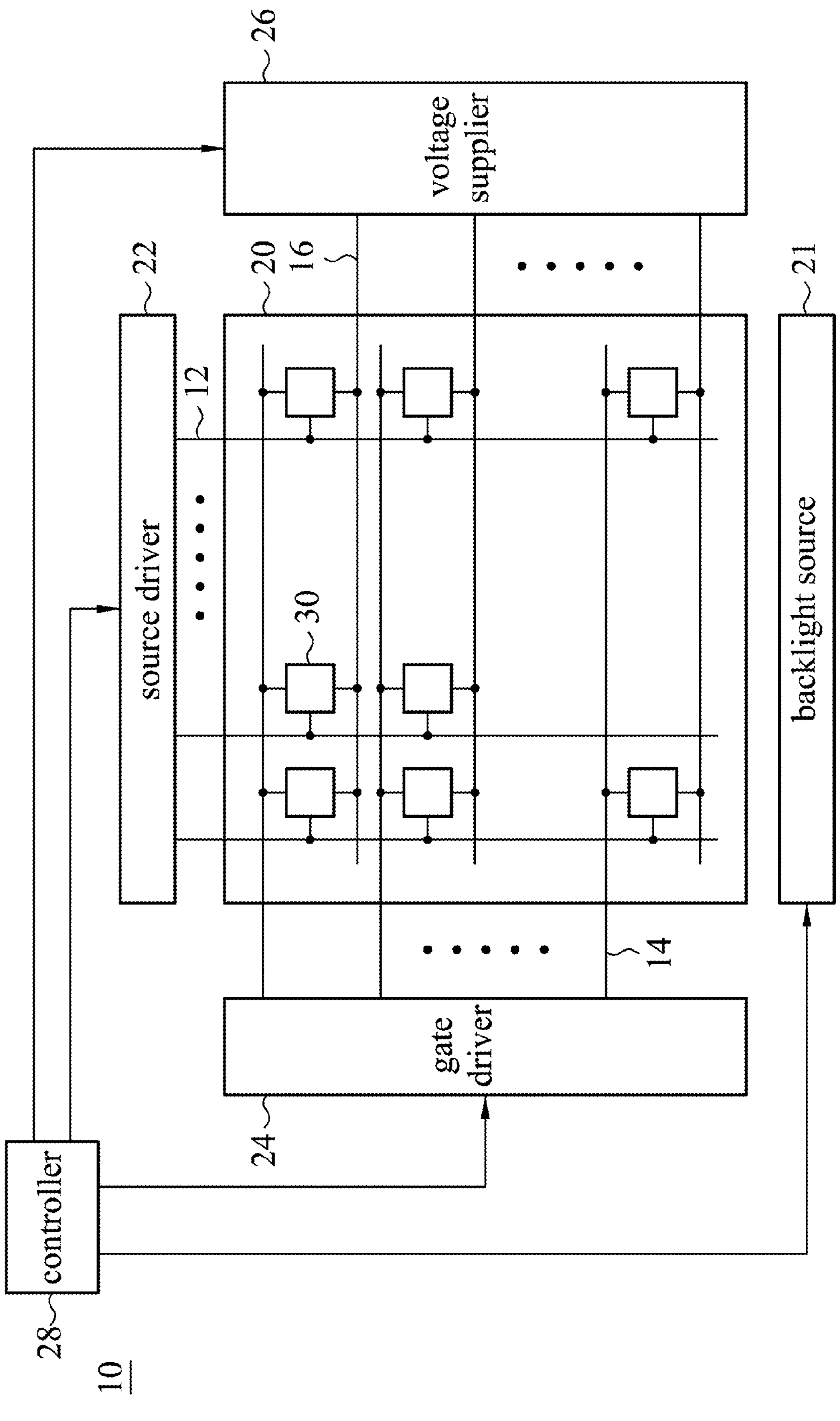
FIG. 2 shows an exemplary embodiment of an active matrix display device.

FIG. 2 shows an exemplary embodiment of an active matrix display device. The display device 10 in FIG. 2 comprises a display panel 20, a backlight source 21, a source driver 22, a gate driver 24, a voltage supplier 26, and a controller 28.

The display panel 20 comprises a plurality of pixels 30 which are arranged in a matrix with columns and rows. Each pixel 30 is disposed in the intersection area between one source line 12 and one gate line 14 and comprises at least one liquid crystal (LC) element. The backlight source 21 is disposed at the backside of the display panel 20 and emits light to the pixels. The display panel 20 changes the arrangement of the liquid crystal molecules by applying voltage and shifts the light from the backlight source 21 by the changed arrangements to show images. In order to achieve the objective, the source driver 22 provides image data to the pixels 30 through corresponding source lines 12, and the gate driver 24 controls pixels 30 through the corresponding gate lines 14. The voltage supplier 26 provides a leakage compensation voltage to the pixels 30 through the voltage supply lines 16. The controller 28 synchronizes the source driver 22, the gate driver 24, and the voltage supplier 26 and controls their operations. Moreover, the controller 28 can control the light from the backlight source 21.

Figure 3:
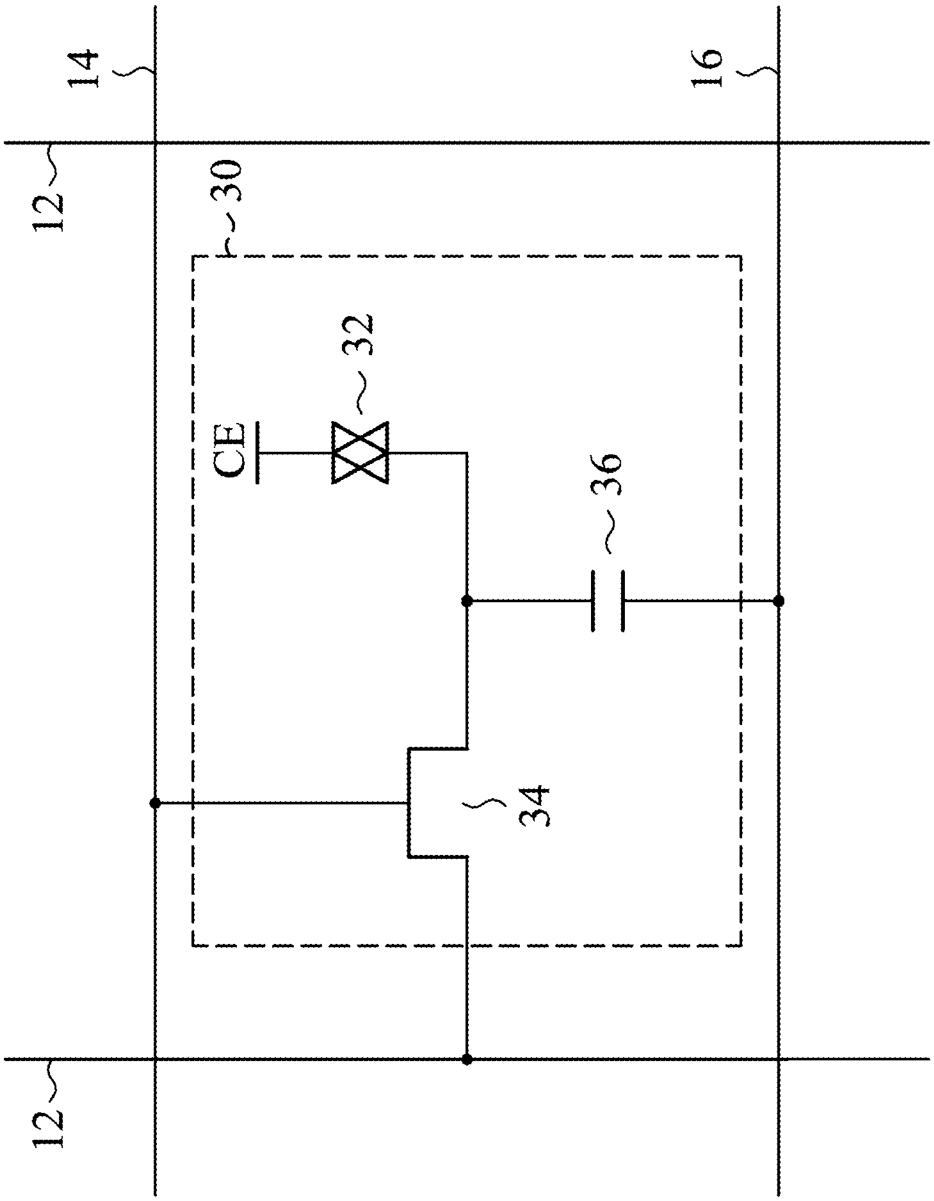
FIG. 3 shows an exemplary embodiment of a pixel.

FIG. 3 shows an exemplary embodiment of a pixel. The pixel 30 in FIG. 3 comprises a liquid crystal 32, a driving controlling switch 34 for controlling the driving of the liquid crystal element 32, and a storage capacitor 36 for storing the image data provided to the liquid crystal element 32 through the driving controlling switch 34.

One terminal of the liquid crystal element 32 is connected to a common electrode line CE, and the other terminal thereof is coupled to the source line 12 through the driving controlling switch 34. The driving controlling switch 34 can be a thin film transistor (TFT) whose control terminal is connected to the gate line 14. When the gate line 14 is at a high level, the driving controlling switch 34 is turned on to apply the voltage of the source line 12 to the liquid crystal element 32.

One terminal of the storage capacitor 36 is connected to the node between the liquid crystal element 32 and the driving controlling switch 34, and the other terminal thereof is connected to the voltage supply line 16. In the embodiment, a CS line connected to a storage capacitor in a conventional pixel serves as the voltage supply line 16 in the embodiment. The voltage supply lines 16 implemented by the arrangement of the CS lines of the pixel matrix do not causes more complex structures for the display device, and the aperture ratio is not lowered. However, in the case, the CS lines in the rows have to be disposed separately. Alternatively, the voltage supply lines 16 are disposed separately from the CS lines. When the gate line 14 is at a low level and the driving controlling switch 34 is turned off, the storage capacitor 36 stores the voltage, which is applied to the liquid crystal element 32 through the driving controlling switch 34, using charges. In practice, as time goes by, the charges accumulated in the storage capacitor 36 may be lost to induce leakage current following to the source line 12 through the driving controlling switch 34. To compensate for the leakage current, in a voltage sustain period of the pixel 30, the voltage supplier 26 provides a predetermined voltage through the voltage supply line 16. By using the coupling effect of the storage capacitor 36, the voltage at the node between the liquid crystal element 32 and the driving controlling switch 34 (that is the node of the liquid crystal element 32 which is opposite to the node of the liquid crystal element 32 connected to the common electrode line CE) is shifted to compensate for the leakage current.

In some embodiments, for one pixel 30 in a row of the matrix, one terminal of the storage capacitor 36 is connected to the node between the liquid crystal element 32 and the driving controlling switch 34, and the other terminal thereof is connected to the gate line on the adjacent row to the row of the pixel 30, such as the gate line of the previous row or the next row. The voltage supplier 26 provides the predetermined voltage to the storage capacitor 36 through the gate line on the previous row or the next row.

Figure 4:
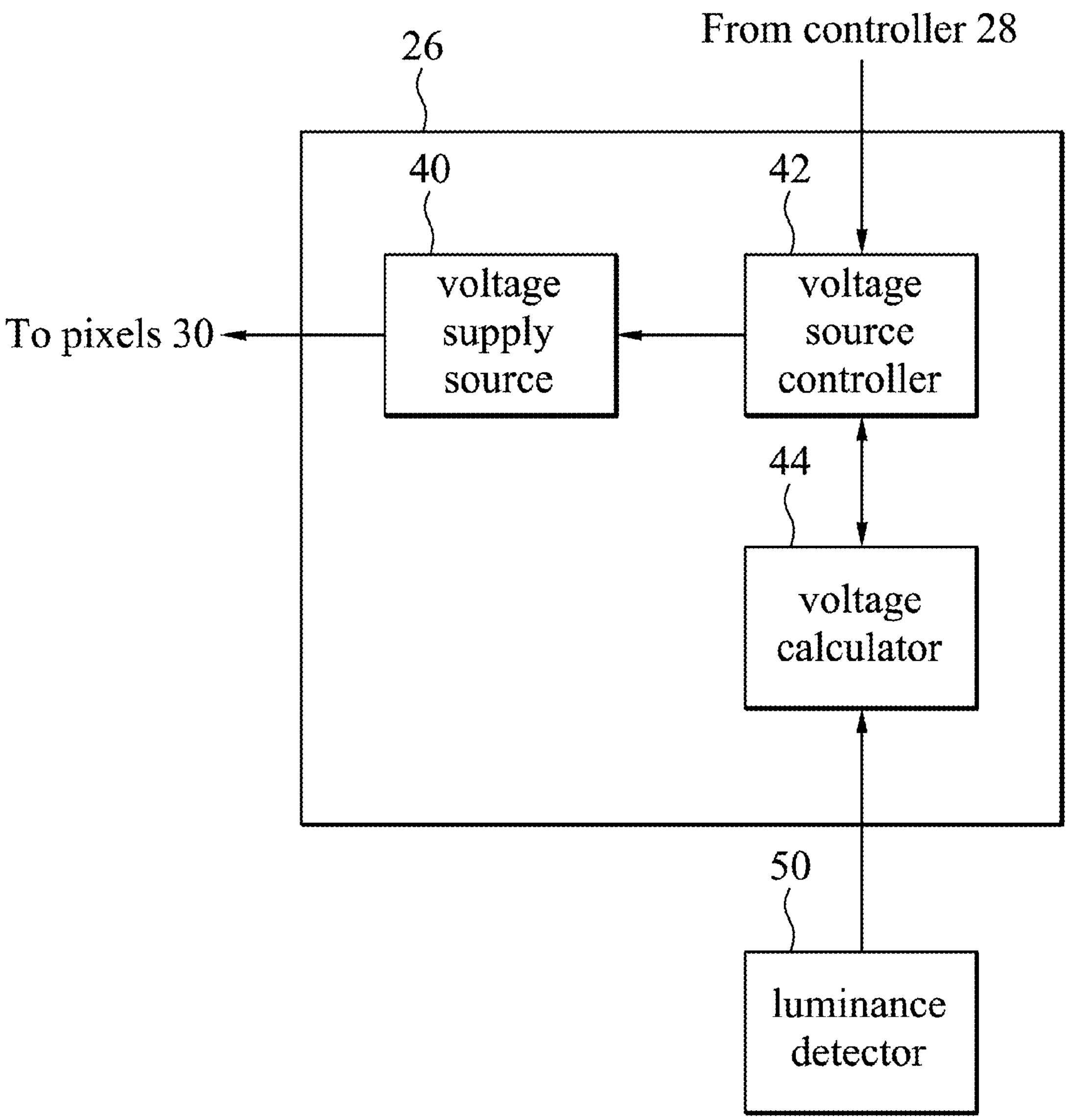
FIG. 4 shows an exemplary embodiment of a voltage supplier.

FIG. 4 shows an exemplary embodiment of a voltage supplier. The voltage supplier 26 in FIG. 4 comprises a voltage supply source 40, a voltage source controller 42, and a voltage calculator 44. The voltage supply source 40 provides the predetermined voltage to pixels 30. The voltage source controller 42 controls the voltage supply source 40 according to a control signal from the controller 28. The voltage calculator 44 calculates the predetermined voltage provided to the pixels 30.

The voltage supply source 40 is a variable voltage source which can provide multi-step voltages or voltages in linear variation. The voltage source controller 42 receives a control signal from the controller 28, wherein the control signal indicates that the leakage current compensation voltage is to be provided to one pixel 30 in the voltage sustain period of the pixel 30. The voltage source controller 42 further controls the voltage supply source 40 to provide the voltage calculated by the voltage calculator 44. The voltage calculator 44 calculates the leakage current compensation voltage provided to the pixels 30 according to the luminance of the backlight source 21 detected by a luminance detector 50.

The voltage calculator 44 performs the voltage calculation by using the relationship between the luminance of the backlight source 21 and the leakage current of the pixel 30 to obtain the required leakage current compensation voltage. Alternatively, the voltage calculator 44 previously stores a look-up table which has the leakage current compensation voltage corresponding to the luminance of the backlight source 21. The voltage calculator 44 obtains the required leakage current compensation voltage by checking the look-up table. The relationship between luminance of the backlight source 21 and the leakage current of the pixel 30 and the look-up table having the leakage current compensation voltage corresponding to the luminance of the backlight source 21 are determined according to the purpose of the display device 10, the element type of the driving controlling switch 34, and/or the function of the voltage source controller 42.

In order to perform the calculation operation by the voltage calculator 44, the display device of the embodiment further comprises a luminance detector 50 for detecting the luminance of the backlight source 21. Since the leakage current of one pixel 30 causes the pixel voltage to lower, the leakage current is the principal reason for flicker. Thus, the amount of the leakage current varies with the luminance of the backlight source 21, in other words, the degree of the flicker is related to the luminance of the backlight source 21. In the embodiment, the luminance of the backlight source 21 is detected, and the leakage current compensation voltage is provided to the pixel 30 according to the detected luminance, thereby compensating for the leakage current to reduce the flicker.

For example, the luminance detector 50 can be implemented by a light detector which is disposed on the display panel 20 and receives light from the backlight source 21, and the light detector detects the luminance of the backlight source 21 by detecting the light. In another embodiment, the luminance detector 50 detects the luminance of the backlight source 21 by measuring the amount of driving current provided to the backlight source 21. The current detection operation can be performed by internal circuits of the backlight source 21 or the controller 28 controlling the backlight source 21. In another embodiment, the luminance detector 50 detects the luminance of the backlight source 21 according to the contents shown in the display panel 20. The content determination operation can be performed by the source driver 22 providing image data to the pixels 30 or the controller 28 controlling the source driver 22.

Figure 5A:
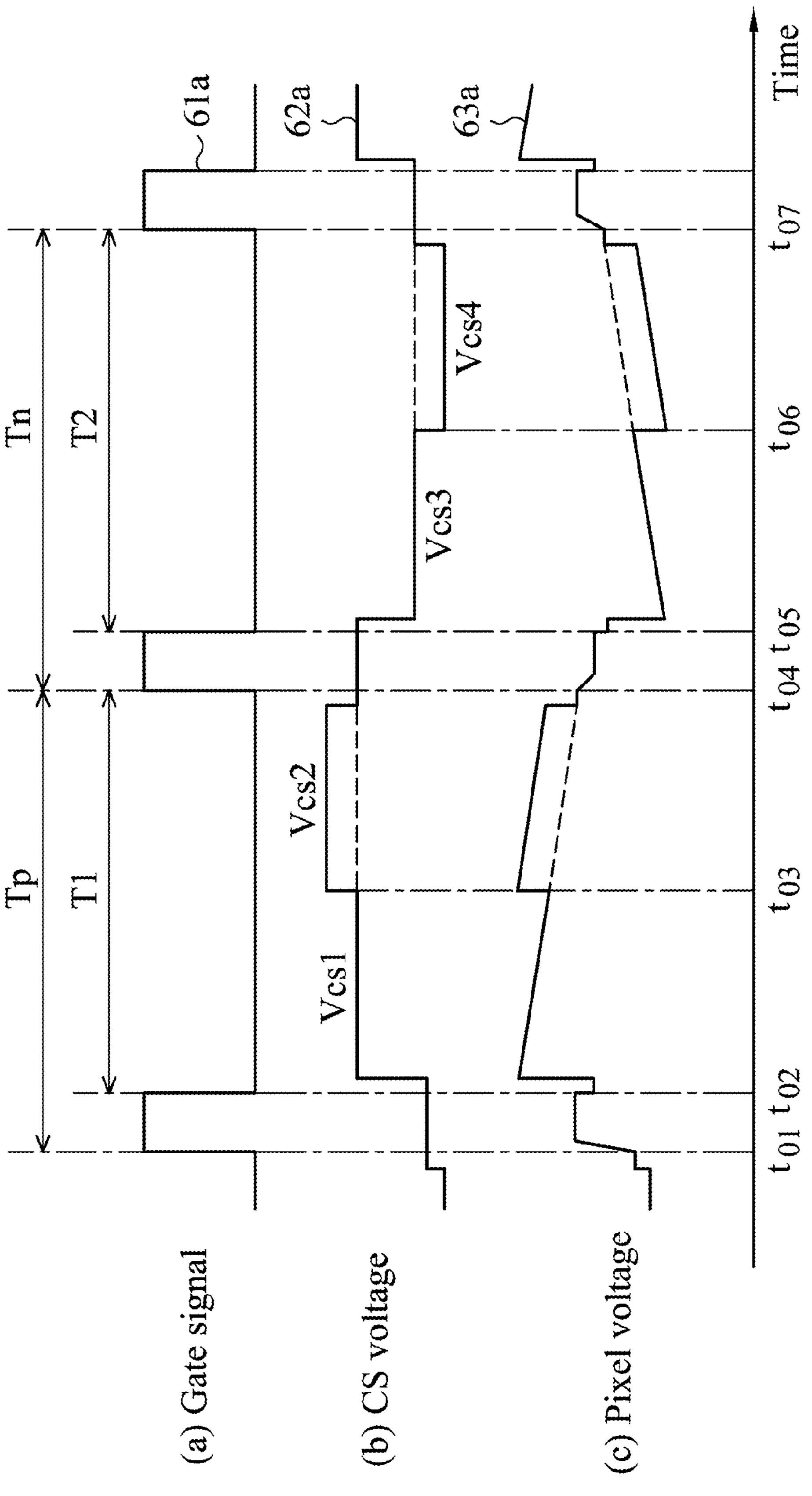
FIG. 5A is a time diagram of an exemplary embodiment of a compensation operation for leakage current by a voltage supplier.

FIG. 5A is a time diagram of an exemplary embodiment of a compensation operation for the leakage current by the voltage supplier. From the top, FIG. 5A shows variations of (a) a gate signal 61*a*, (b) a CS voltage 62*a*, and (c) a pixel voltage 63*a* sequentially.

The gate signal 61*a* is a signal provided from the gate driver 24 to the control terminal of the driving controlling switch 34 in one pixel 30 through the gate line 14. In the embodiment, when the gate signal 61*a* is at a high level, the gate signal 61*a* can turn on the driving controlling switch 34. When the driving controlling switch 34 is turned on, the voltage, which is provided from the source driver 22 through the source line 12 and represents the image data, is applied to the liquid crystal element 32.

The CS voltage 62*a* is a voltage provided from the voltage supplier 26 to the storage capacitor 36 in the pixel 30 through the voltage supply line 16 (the voltage supply line 16 is implemented by a CS line in the embodiment). For a period Tp of a first frame from the time point $t_{01}$ at one rising edge of the gate signal 61*a* to the time point $t_{04}$ at the next rising edge of the gate signal 61*a*, in a period T1 ($t_{02}$~$t_{04}$) when the gate signal 61*a* is at a low level and the driving controlling switch 34 is turned off (that is in a voltage sustain period), the CS voltage 62*a* varies by two steps Vcs1 and Vcs2. The CS voltage 62*a* is equal to the first voltage Vcs1 in the front half ($t_{02}$~$t_{03}$) of the voltage sustain period T1 and equal to the second voltage Vcs2 in the back half ($t_{03}$~$t_{04}$) of the voltage sustain period T1, wherein the second voltage Vcs2 is higher than the first voltage Vcs1.

The pixel voltage 63*a* is a voltage at the node between the liquid crystal element 32 and the driving controlling switch 34, that is at the node of the liquid crystal element 32 which is opposite to the node of the liquid crystal element 32 connected to the common electrode line CE. The pixel voltage 63*a* is stored in the storage capacitor 36 by charges in the voltage sustain period T1.

Assume that the voltage supplier 26 is not provided. As the dotted line in FIG. 5A, the CS voltage 62*a* does not vary in the voltage sustain period T1 and continuously remains at the level of the voltage Vcs1, and the pixel voltage 63*a* declines. This is because the charges accumulated in the storage capacitor 36 are lost as time goes by to induce leakage current following to the source line 12 through the driving controlling switch 34. However, in the embodiment, since the CS voltage 62*a* is varied from the voltage Vcs1 to the voltage Vcs2, the reduction in pixel voltage 63*a* is compensated for by the formula Ccs/Cpixel×ΔVcs which responds to the variation of the CS voltage 62*a* (ΔVcs=Vcs2-Vcs1). In the above formula, Ccs represents the capacitance of the storage capacitor 36, and Cpixel represents the total capacitance of the pixel.

According to the above description related to FIG. 4, the value of the CS voltage 62*a* which is provided from the voltage supplier 26 through the voltage supply line 16 is calculated by the voltage calculator 44 in the voltage supplier 26. According to the luminance of the backlight source 21 detected by the luminance detector 50 before the voltage sustain period T1, the voltage calculator 44 calculates the step value from the first voltage Vcs1 to the second voltage Vcs2 which is provide to the pixel in the voltage sustain period T1. Assume that variation of the luminance of the backlight source 21 occurs in one frame period Tp is considered. According to the luminance of the backlight source 21 detected by the luminance detector 50 before the voltage sustain period T1, the voltage calculator 44 calculates the first voltage Vcs1. Then, in the voltage sustain period T1, according to the luminance of the backlight source 21 detected by the luminance detector 50 by a predetermined sampling cycle, the voltage calculator 44 calculates the voltage Vcs2 which is present after the variation of the CS voltage.

In the embodiment of FIG. 5A, the CS voltage 62*a* in the second frame period Tn is also varied by two steps Vcs3 and Vcs4. The second frame period Tn when the voltage with inverse polarity is provided and the first frame period Tp are referred to one set. However, in other embodiments, the CS voltage 62*a* is varies by the multi-step manner only in the first frame period Tp or the second frame period Tn.

Additionally, in the embodiment of FIG. 5A, the CS voltage 62*a* can be varied by more than two steps instead of just two steps.

Figure 5B:
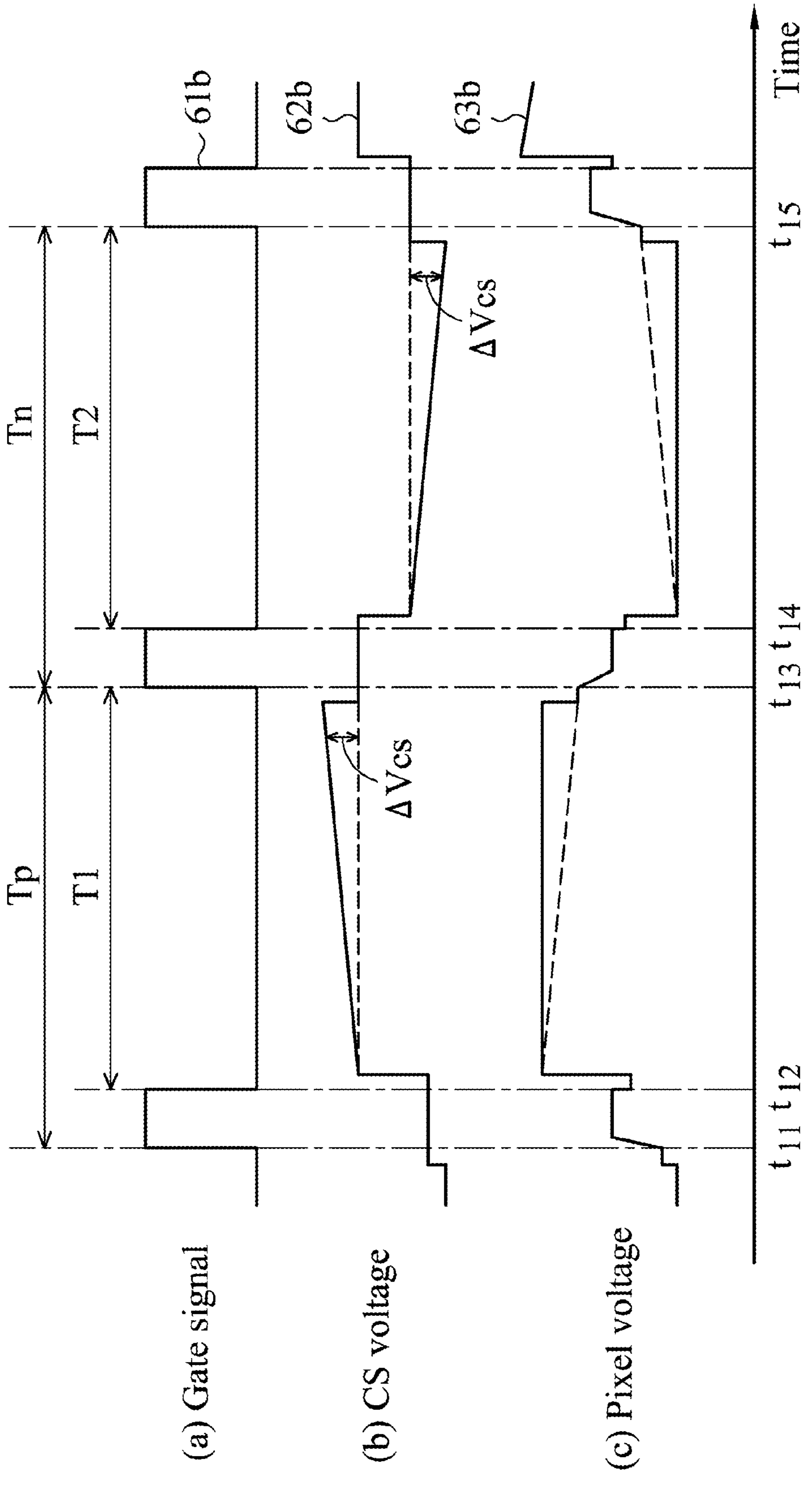
FIG. 5B is a time diagram of another exemplary embodiment of a compensation operation for leakage current by a voltage supplier.

FIG. 5B is a time diagram of another exemplary embodiment of a compensation operation for the leakage current by the voltage supplier. From the top, FIG. 5B shows variations of (a) a gate signal 61*b*, (b) a CS voltage 62*b*, and (c) a pixel voltage 63*b* sequentially.

In the embodiment, the CS voltage 62*b* is increased or decreased by a linear variation with a predetermined slope in the voltage sustain periods T1 and T2. Thus, in the voltage sustain periods T1 and T2, the pixel voltage 63*b* does not decline and remains at a fixed level. This is because in the voltage sustain periods, a predetermined voltage ΔVcs with a linear characteristic and a predetermined slope is provided to the node of the storage capacitor 36 which is opposite to the node of the storage capacitor 36 connected to the liquid crystal element 32.

In any one of the embodiments of FIGS. 5A and 5B, in the voltage sustain periods, the voltage supplier 26 provides a predetermined voltage to the node of the storage capacitor 36 which is opposite to the node of the storage capacitor 36 connected to the liquid crystal element 32, thereby compensating for leakage current to prevent the pixel voltage from lowering and avoiding flicker caused by the lowered pixel voltage. Moreover, as shown in FIG. 3, since the structure of each pixel is not required to change when providing the compensation voltage to the pixel, the aperture ratio of the pixel is not reduced.

Figure 6:
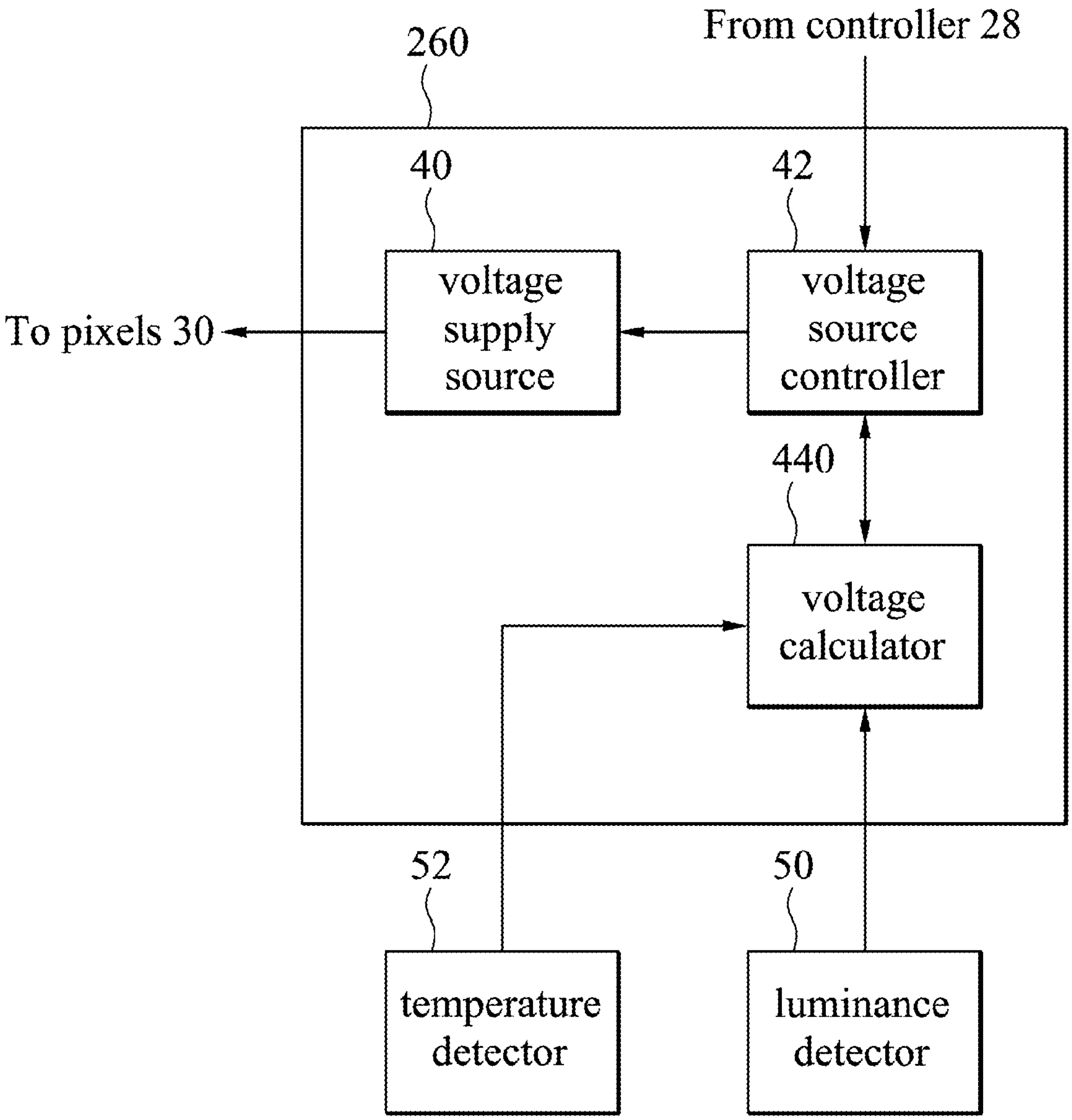
FIG. 6 shows another exemplary embodiment of a voltage supplier.

FIG. 6 shows another exemplary embodiment of a voltage supplier. A voltage supplier 260 in FIG. 6 has a similar structure to the voltage supplier 26 in FIG. 4. However, the difference between the voltage supplier 260 in FIG. 6 and the voltage supplier 26 in FIG. 4 is that the a voltage calculator 440 of the voltage supplier 260 calculates a predetermined voltage provided to the pixels 30 not only according to the luminance of the backlight source 21 but also according to temperature factor.

The display device in the embodiment further comprises a temperature detector 52. The temperature detector 52 is disposed in any position in the display device. As described above, the leakage current from one pixel 30 causes the corresponding pixel voltage to lower, thereby resulting in flicker. Thus, the amount of the leakage current varies with the luminance of the backlight source 21. Moreover, the amount of leakage current is also affected by temperature characteristics of the elements in the pixel 30, such as the driving controlling switch 34, and variations in temperature. Thus, the degree of the flicker is related to the luminance of the backlight source 21 and the temperature. By detecting the temperature and providing the leakage current compensation voltage to the pixel 30, the leakage current resulting in the flicker can be compensated for.

A voltage calculator 440 calculates the leakage current compensation voltage, which is provided to each pixel 30, according to the luminance of the backlight source 21 detected by the luminance detector 50 and the temperature detected by the temperature detector 52. The voltage calculator 440 calculates the leakage current compensation voltage according to the relationship between the luminance of the backlight source 21, the temperature, and the leakage current of the pixel 30. Alternatively, the voltage calculator 440 previously stores a look-up table which has the leakage current compensation voltage corresponding to the luminance of the backlight source 21 and the temperature. The voltage calculator 440 obtains the required leakage current compensation voltage by checking the look-up table. The relationship between the luminance of the backlight source 21, the leakage current of the pixel 30, and the temperature and the look-up table having the leakage current compensation voltage corresponding to the luminance of the backlight source 21 and the temperature are determined according to the purpose of the display device 10, the element type of the driving controlling switch 34, and/or the function of the voltage source controller 42.

Figure 7:
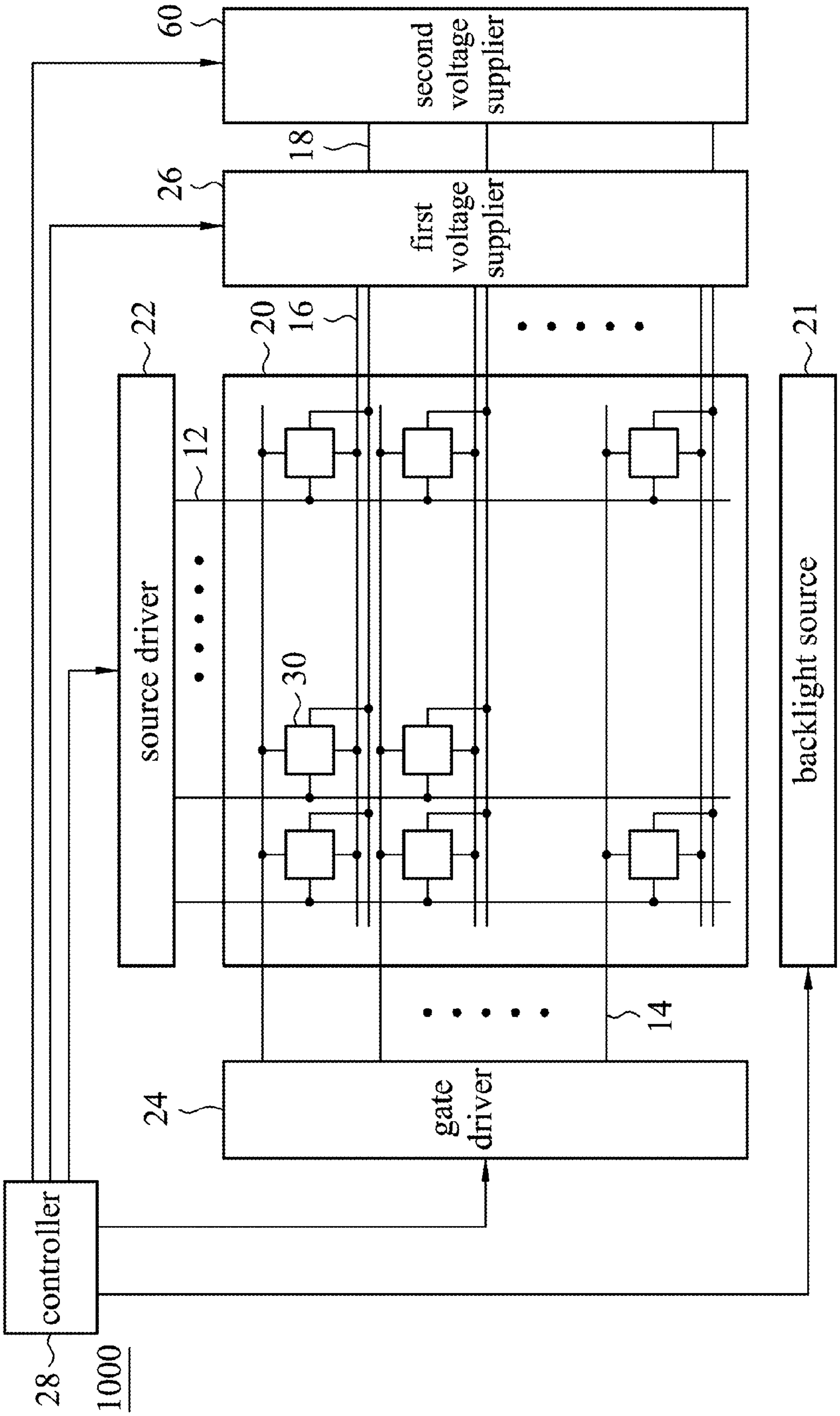
FIG. 7 shows another exemplary embodiment of an active matrix display device.

FIG. 7 shows another exemplary embodiment of an active matrix display device. The display device 1000 is similar to the display device in FIG. 2. However, the difference between the display devices in FIGS. 2 and 7 is that the display device 1000 further comprises a voltage supplier 60 which provides a second leakage current compensation voltage to the pixels 30 through corresponding second voltage supply lines 18. The first voltage supply lines 16 and the second voltage supply lines 18 are disposed separately. The voltage supplier 60 is controlled by the controller 28.

Referring to FIG. 3, through the first voltage supply lines 16 implemented by CS lines, the first voltage supplier 26 is coupled to the node of the storage capacitor 36 which is opposite to the node of the storage capacitor 36 connected to the liquid crystal element 32. As the description of FIGS. 5A and 5B, in the voltage sustain periods, the first voltage supplier 26 provides a first leakage current compensation voltage to the storage capacitor 36.

The second voltage supplier 60 is coupled to the node of the liquid crystal element 32 which is opposite to the node of the liquid crystal element 32 connected to the storage capacitor 36. In the embodiment, a common electrode line CE coupled to a liquid crystal element 32 in a conventional pixel serves as the second voltage supply line 18. The second voltage supply lines 18 implemented by the arrangement of the common electrode lines CE of the pixel matrix does not create a more complex structure for the display device, and the aperture ratio is not lowered. However, in this case, the common electrode lines CE have to be disposed separately in rows. Alternatively, the second voltage supply lines 18 and the common electrode lines CE are disposed separately.

The second voltage supplier 60 has a similar structure to the voltage supplier 26 in FIG. 2 and the voltage supplier 260 in FIG. 6. Thus, the structure of the second voltage supplier 60 is omitted in the description. Moreover, the operation for providing a leakage current compensation voltage of the second voltage supplier 60 is similar to the voltage supplier 26 in FIGS. 5A and 5B. That is, the voltages of the common electrode lines CE vary by two or more steps, or in a linear manner. Accordingly, the leakage current can be compensated for to prevent the pixel voltage form lowering, thereby eliminating flicker.

According to the above embodiment, the voltage level at the node coupled to the common electrode line CE of the liquid crystal element 32 is shifted to compensate for the leakage current.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

For example, in the above embodiments, after receiving the control signal from the controller 28, the voltage supplier starts to perform the compensation for the leakage current. However, the voltage supplier may start to perform the compensation for the leakage current after receiving a signal which indicates that the gate signals from the gate driver 24 is at a high/low level.

Moreover, in the above embodiments, the voltage supply lines are disposed in respective rows in the pixel matrix. However, according to different driving manners of the display device, such as a dot inversion, a horizontal or vertical inversion (line inversion), or frame inversion, the voltage supply lines are disposed in the respective columns or respective pixels.

What is claimed is:

1. An active matrix display device which comprises a plurality of pixels arranged in a matrix and a backlight source disposed at the backside of the matrix and emitting light to the matrix, wherein each of the pixels comprises:

- a liquid crystal element;
- a driving controlling switch for controlling the driving of the liquid crystal element; and
- a storage capacitor for storing image data provided to the liquid crystal element through the driving controlling switch;

wherein the display device further comprises:

a luminance detector for detecting luminance of the backlight source;

a first voltage supplier, wherein according to the detected luminance of the backlight source, the first voltage supplier, in a sustain period of the image data, provides a predetermined voltage to a node of the storage capacitor which is opposite to a node of the storage capacitor coupled to the liquid crystal element; and a temperature detector for detecting temperature;

wherein the first voltage supplier comprises:

a variable voltage supply source;

a voltage calculator for calculating the first predetermined voltage according to the detected luminance of the backlight source by the luminance detector; and a voltage source controller for controlling the variable voltage supply source which provides the first predetermined voltage which is calculated by the voltage calculator;

wherein the voltage calculator calculates the first predetermined voltage according to the luminance of the backlight source detected by the luminance detector and the temperature detected by the temperature detector.

2. The active matrix display device as claimed in claim 1, wherein the luminance detector detects the luminance of the backlight source by detecting the light from the backlight source.

3. The active matrix display device as claimed in claim 1, wherein the luminance detector detects the luminance of the backlight source by measuring the amount of driving current used to drive the backlight source.

4. The active matrix display device as claimed in claim 1, wherein the luminance detector detects the luminance of the backlight source according to content shown by the display device.

5. The active matrix display device as claimed in claim 1, wherein the voltage calculator calculates the first predetermined voltage according to a relationship between the luminance of the backlight source and leakage current of the driving controlling switch.

6. The active matrix display device as claimed in claim 1, wherein the voltage calculator stores a look-up table which contains the first predetermined voltage corresponding to the luminance of the backlight source.

7. The active matrix display device as claimed in claim 1, wherein the first voltage supplier provides the first predetermined voltage to the storage capacitor through a CS line.

8. The active matrix display device as claimed in claim 1, wherein for one pixel on a row of the matrix, the first voltage supplier provides the first predetermined voltage to the storage capacitor of the one pixel through a gate line on an adjacent row to the row of the one pixel.

9. The active matrix display device as claimed in claim 1 further comprises a second voltage supplier, wherein according to the detected luminance of the backlight source, the second voltage supplier, in a sustain period of the image data, provides a second predetermined voltage to a node of the liquid crystal element which is opposite to a node of the liquid crystal element coupled to the storage capacitor.

10. An active matrix display device which comprises a plurality of pixels arranged in a matrix and a backlight source disposed at the backside of the matrix and emitting light to the matrix, wherein each of the pixels comprises:

a liquid crystal element;

a driving controlling switch for controlling the driving of the liquid crystal element; and a storage capacitor for storing image data provided to the liquid crystal element through the driving controlling switch;

wherein the display device further comprises:

a luminance detector for detecting luminance of the backlight source;

a first voltage supplier, wherein according to the detected luminance of the backlight source, the first voltage supplier, in a sustain period of the image data, provides a predetermined voltage to a node of the storage capacitor which is opposite to a node of the storage capacitor coupled to the liquid crystal element; and a second voltage supplier, wherein according to the detected luminance of the backlight source, the second voltage supplier, in a sustain period of the image data, provides a second predetermined voltage to a node of the liquid crystal element which is opposite to a node of the liquid crystal element coupled to the storage capacitor;

wherein the second voltage supplier provides the second predetermined voltage to the liquid crystal element through a common electrode line.

11. An electronic device comprising an active matrix display device as claimed in claim 1.

12. The active matrix display device as claimed in claim 9, wherein the second voltage supplier provides the second predetermined voltage to the liquid crystal element through a common electrode line.

13. The active matrix display device as claimed in claim 10, wherein the luminance detector detects the luminance of the backlight source by detecting the light from the backlight source.

14. The active matrix display device as claimed in claim 10, wherein the luminance detector detects the luminance of the backlight source by measuring the amount of driving current used to drive the backlight source.

15. The active matrix display device as claimed in claim 10, wherein the luminance detector detects the luminance of the backlight source according to content shown by the display device.

16. The active matrix display device as claimed in claim 10, wherein the first voltage supplier comprises:

a variable voltage supply source;

a voltage calculator for calculating the first predetermined voltage according to the detected luminance of the backlight source by the luminance detector; and a voltage source controller for controlling the variable voltage supply source which provides the first predetermined voltage which is calculated by the voltage calculator.

17. The active matrix display device as claimed in claim 10, wherein the first voltage supplier provides the first predetermined voltage to the storage capacitor through a CS line.

18. The active matrix display device as claimed in claim 10, wherein for one pixel on a row of the matrix, the first voltage supplier provides the first predetermined voltage to the storage capacitor of the one pixel through a gate line on an adjacent row to the row of the one pixel.

* * * * *